United States Patent [19]

Glasscock, Sr.

[11] 4,209,888

[45] Jul. 1, 1980

[54] SHAFT PULLER

[76] Inventor: Theodore E. Glasscock, Sr., 908 Daniel, Cedar Hill, Tex. 75104

[21] Appl. No.: 853,517

[22] Filed: Nov. 21, 1977

[51] Int. Cl.[2] .......... B23P 19/04

[52] U.S. Cl. .......... 29/263

[58] Field of Search .......... 29/256, 263, 264; 81/53.2

[56] References Cited

U.S. PATENT DOCUMENTS

| | | | |
|---|---|---|---|
| 3,123,901 | 3/1964 | Traugott | 29/263 |
| 3,727,491 | 4/1973 | Buckwalter | 81/53.2 |

FOREIGN PATENT DOCUMENTS

| | | | |
|---|---|---|---|
| 2629976 | 5/1978 | Fed. Rep. of Germany | 29/256 |
| 260724 | 6/1926 | United Kingdom | 29/256 |

*Primary Examiner*—James L. Jones, Jr.
*Attorney, Agent, or Firm*—Richards, Harris & Medlock

[57] ABSTRACT

A shaft puller is provided for extracting a shaft having a threaded end exposed from a surround structure. The puller includes a housing having a threaded bore therethrough with the threads being of an opposite hand from the threads of the shaft. The puller also includes a spindle member having external threads which threadably engage the bore of the housing. The spindle member also has a bore therethrough to permit engagement of the spindle member and housing onto the shaft. With the spindle member engaged into the housing, the spindle is placed over the shaft and a nut, normally received on the shaft, engaged thereon against the end surface of the spindle member. By turning the spindle member in a direction to advance the nut on the shaft, the spindle member turns out of the housing to extract the shaft from its surround structure by acting between a reaction face on the surround structure and the nut on the shaft.

9 Claims, 5 Drawing Figures

SHAFT PULLER

BACKGROUND OF THE INVENTION

1. Field of the Invention

This invention relates to a shaft puller and more particularly to a puller for use in extracting a shaft having a threaded and exposed from a surround structure.

2. Prior Art

In many situations, it is necessary to apply a mechanical advantage to extract a shaft which is tightly fitted or has become frozen within associated surround structure. Such a situation commonly exists with regard to the propeller shaft of an outboard motor. In this structure, the shaft is supported in a motor housing by bearings and retained in position by appropriate retaining structure. One end of the shaft protrudes from the motor housing and receives the outboard motor propeller which is attached to the shaft by engaging a nut on the threaded exposed end of the shaft. With the propeller retaining structure removed from the shaft, the shaft is often very difficult to remove because of corrosion or the tight fit of cooperating structure.

Heretofore, there has been no simple structure for providing a mechanical advantage to extract the propeller shaft. Although pullers of a general nature are available, existing puller structures have not been adaptable to the problem of extracting this type of shaft and has generally been inferior in their own design. For example, a stud bolt puller is disclosed in U.S. Pat. No. 3,727,491 to Buckwalter, issued Apr. 17, 1973. In that structure, a sleeve having an internal threaded bore receives a central member therein. The central member has an internal bore which may be threadably engaged over the threaded end of the stud to be removed. With the central member engaged in the sleeve member and threaded onto the stud, the sleeve member is turned while the central member is maintained stationary. In this way, the central member is turned out of the sleeve member to extract the stud.

This arrangement introduces several problems. First, the sleeve member is rotated relative to the surface in which the stud is lodged. The rotational contact between these two members is undesirable in that damage to the surface can easily occur. Additionally, in its use, the stud extractor must be engaged at two points. The central member must be maintained stationary while the sleeve member is rotated.

In a second application of the Buckwalter extractor, the sleeve member is retained stationary and the central member is backed out of the sleeve member. In this arrangement however, the turning of the central member out of the sleeve member may also result in the unthreading of the central member from the stud. If this occurs, the stud will not be lifted from the block in which it is embedded.

Therefore, a need has arisen for a shaft puller which may be operated by engaging the puller at only one point and which positively extracts the shaft without requiring that any of the elements of the puller be in rotational contact with the shaft surround structure.

SUMMARY OF THE INVENTION

The present invention is directed to a shaft puller which overcomes many of the shortcomings of pullers heretofore used. Although a primary application of the shaft puller of the present invention is in extracting the propeller shaft from an outboard motor, it will be understood that the present puller may be used to extract any type of shaft from a surround structure where a mechanical advantage is required.

In one embodiment of the present invention, a shaft puller is provided for extracting a shaft having a threaded end extending from a surround structure. The puller includes a sleeve structure having a threaded bore therethrough with the threads being of an opposite hand from the threads of the shaft. A spindle member having external threads is threadably engageable within the bore of the sleeve structure. The spindle member also has a bore therethrough to permit engagement of the spindle member and the sleeve structure on the shaft.

In using the puller to extract the shaft, the sleeve structure with the spindle member threaded therein is engaged onto the shaft. A nut, normally received on the shaft, is threaded onto the shaft until it engages the end surface of the spindle member. As the nut is threaded onto the shaft, the spindle member is rotated in a similar direction as a result of frictional engagement between the nut and the head of the spindle member. As the nut is threaded onto the shaft, the spindle member is withdrawn from the sleeve structure because the spindle member and the sleeve structure threads are opposite those of the shaft and nut. As the spindle member is withdrawn from the sleeve structure, the shaft is extracted from the surround structure by the mechanical leverage between a reaction face on the surround structure and the nut on the shaft.

In one embodiment of the invention, the spindle member is fitted with a head plate attached to the end of the spindle member opposite the end engaged in the sleeve structure. The head plate provides surfaces which may be engaged by a wrench tool to facilitate turning the spindle member either separately or in conjunction with engagement of the nut on the shaft. The engagement surface on the head plate may be of an identical wrench size to that of the nut so that both the head plate and the shaft nut may be turned simultaneously with one tool. Of course, as described above, both the spindle member and the nut are advanced in the same direction with the nut being advanced on the shaft and the spindle member being turned out of the sleeve structure as a result of the opposing thread design.

In still another embodiment of the invention, the shaft sleeve structure is characterized by a cylindrical hub having the threaded bore therethrough for receiving the spindle member and an annular shoulder extending from the hub. The annular shoulder normally has an outer diameter somewhat larger than the hub with a leading abutment end projecting beyond the end of the hub for contact with the reaction surface on the surround structure.

In one embodiment of the invention, a ring insert is receivable within the annular shoulder to provide more reaction surface with the reaction face on the surround surface. In this way, the puller of the present invention may be used on different site structures.

DETAILED DESCRIPTION OF THE DRAWINGS

For a more complete understanding of the present invention, and for further details and advantages thereof, reference is now made to the following description taken in conjunction with the accompanying drawings, in which.

DESCRIPTION OF THE PREFERRED EMBODIMENTS

Figures 1, 2, 3, 4, 5:
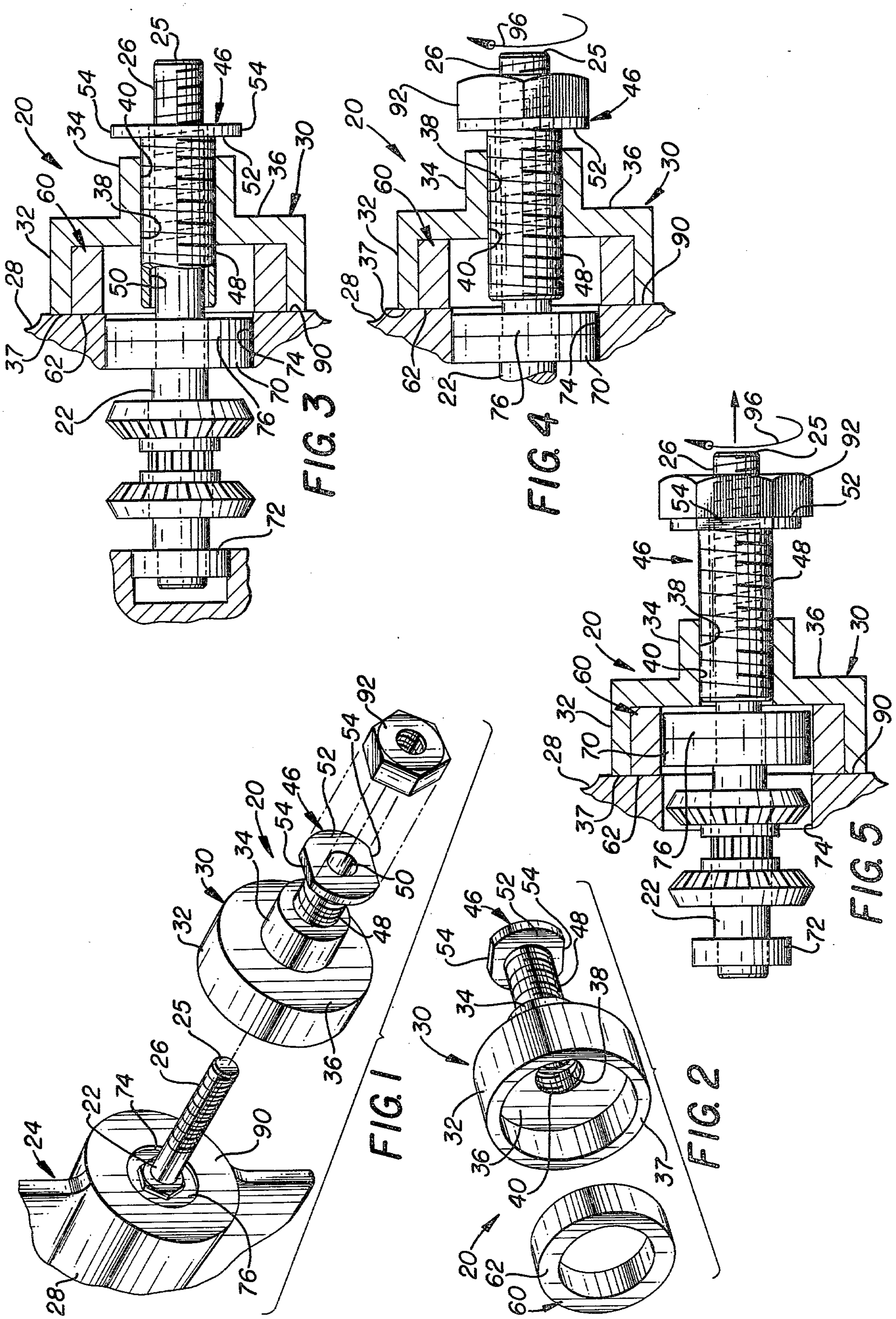
FIG. 1 is an exploded perspective view showing the puller of the present invention as it is mounted for use on an outboard motor propeller shaft.
FIG. 2 is a perspective view of the puller of the present invention showing the face of the puller opposite that shown in FIG. 1.
FIG. 3 is a vertical section view showing the puller of the present invention mounted on the propeller shaft.
FIG. 4 is a vertical section of the puller of the present invention mounted on the propeller shaft with the propeller shaft nut engaged on the shaft.
FIG. 5 is a further section view of the puller of the present invention mounted on the propeller shaft showing the spindle member withdrawn from the sleeve structure during extraction of the shaft.

FIG. 1 illustrates a perspective exploded view of the puller 20 of the present invention as it is mounted for use on a shaft 22 of outboard motor 24. Shaft 22 has an end 25 protruding from motor surround structure 28 with threads 26 formed thereon. FIG. 2 also shows in a perspective exploded view, the components of the puller of the present invention as seen from the side opposite that shown in FIG. 1.

Referring to both FIGS. 1 and 2, puller 20 includes a sleeve structure 30 including an annular shoulder 32 and a cylindrical hub 34 attached to shoulder 32 by circular plate 36. Shoulders 32 have an abutment surface 37 for engagement with the surround structure around shaft 22 as will be hereinafter discussed in detail. Hub 34 has a threaded internal bore 38 with threads 40 of an opposite hand to threads 26 on shaft 22. A spindle member 46 has external threads 48 for mating with the internal threads 40 of bore 38. Spindle 46 also has a concentric bore 50 therethrough which is of sufficient size to permit the engagement of spindle member 46 over propeller shaft 22. Spindle 46 is also adapted at one end with a head plate 52. Head plate 52 has two flat parallel flats 54 for engagement by a wrench tool to facilitate the turning of spindle member 46.

In one embodiment of the invention, the puller also includes a ring insert 60 which mates within the annular shoulder 32 of sleeve structure 30. The outer diameter of ring insert 60 is substantially the same as the inside diameter of annular shoulders 32 such that the insert is maintained in a fixed position upon insertion into sleeve structure 30. The thickness of ring insert 60 is equal to or slightly greater than the height of annular shoulders 32 such that the face 62 of ring insert 60 is flush with or extends above the abutment surface 37 of shoulders 32.

FIG. 3 illustrates the puller 20 of the present invention mounted on an outboard motor propeller shaft 22. Shaft 22 is supported in surround structure 28 by bearings 70 and 72. The assembly is normally retained in position by a gland nut threaded in recess 74. With the gland nut in place, shaft 22 is held in position by the action of the gland nut against bellows 76 acting against bearing 70. A propeller is normally keyed to shaft 22 and retained thereon by a retainer nut. FIG. 3 shows the motor with the propeller, retainer nut and gland nut removed to permit the extraction of shaft 22. Even though these retaining structures are removed, the shaft is normally frozen in position due to corrosion or interference fit between parts associated with the operation of shaft 22.

FIG. 3 shows puller 20 positioned on shaft 22 with spindle member 46 threaded substantially into hub 34. Ring insert 60 is also in position within sleeve structure 30. The puller assembly is engaged onto shaft 22 such that abutment face 62 of ring insert 60 and abutment surface 37 of annular shoulder 32 are engaged against a reaction surface 90 of surround structure 28.

Referring to FIG. 4, retainer nut 92 normally used to retain the propeller shaft on shaft 22 is engaged on threads 26 until the nut contacts head plate 52. Normally, threads 26 of shaft 22 will be right-hand threads. In this case, threads 48 of spindle member 46 are left-hand threads. In other words, the threads of spindle member 46 are always of an opposite hand to the threads of shaft 22. In use of the puller 20, a wrench or other suitable tool is engaged either directly on nut 92 or head plate 52, or simultaneously over both, and rotated in the direction of arrow 96 (FIG. 4) to advance nut 92 onto shaft 22. With this rotation, and with sleeve structure 30 retained constant by the frictional surface contact between the abutment edges of ring insert 60 and annular shoulders 32 against reaction surface 90, spindle member 46 is turned out of hub 34 of sleeve structure 30. As a result, and with the telescoping of spindle member 46 from sleeve structure 30, shaft 22 is extracted from the surround structure.

It will now be appreciated that as a result of the opposite thread directions between threads 26 of shaft 22 and threads 48 of spindle member 46, only one wrench is needed to extract shaft 22. Likewise, both the engagement of nut 92 along threads 26 of shaft 22 and the backing out of spindle member 46 from sleeve structure 30 act in conjunction to extract shaft 22 from surround structure 28.

It should also be noticed that in the present invention, sleeve structure 30 remains stationary relative to the surround structure 28 thereby eliminating any possible damage which normally results from those pullers where there is relative rotation between these members. Also, the user of the puller of the present invention need only engage and turn nut 92. The frictional contact between the nut 92 and head plate 52 will in turn serve to rotate spindle member 46 to withdraw it from sleeve structure 30. Alternatively, flats 54 on head plate 52 may be engaged with a wrench tool and turned to withdraw spindle member 46 from sleeve structure 30.

Therefore, the present invention provides a positive acting shaft puller which may be operated by the use of a single wrench tool. Also, the present invention eliminates any rotational contact between the puller and the surround structure from which the shaft is extracted.

Although preferred embodiments of the invention have been described in the foregoing Detailed Description and illustrated in the accompanying Drawings, it will be understood that the invention is not limited to the embodiments disclosed, but is capable of numerous rearrangements, modifications and substitutions of parts and elements without departing from the spirit of the invention. The present invention is therefore intended to encompass such rearrangements, modifications and substitutions of parts and elements as fall within the scope of the appended claims.

What is claimed is:

1. A shaft puller for extracting a shaft from a surround structure, said shaft having a threaded exposed end normally receiving a nut thereon, said puller comprises:

a one piece sleeve structure having an internally threaded bore therethrough, the threads being of an opposite hand from the threads of said shaft, a spindle member having external threads thereon for threadable engagement within the bore of said sleeve structure and an unthreaded bore therethrough to permit engagement of said spindle member on said shaft without engagement of said shaft, said spindle member having an end surface to facilitate rotation of said spindle member relative to said sleeve structure, and a nut for engagement on said shaft with said sleeve member and spindle member mounted between said nut and the surround structure whereby turning said spindle member in the direction to advance said nut on the shaft withdraws the spindle member from said sleeve structure to pull the shaft from the surround structure.

2. The shaft puller according to claim 1 further comprising:

a head plate attached to the end of said spindle member opposite the end engaged in said housing, said head plate adapted to receive a wrench tool to facilitate turning the spindle member relative to said sleeve structure.

3. The shaft puller according to claim 1 wherein said sleeve structure is characterized by an annular shoulder directly engageable with the surround structure from which said shaft protrudes and a reduced cylindrical hub projecting axially beyond said shoulder for threadably receiving said spindle member.

4. The shaft puller according to claim 3 further comprising:

a ring insert receivable within said annular shoulder to provide more reaction surface with the surround structure.

5. The shaft puller according to claim 1 wherein said sleeve structure is characterized by:

A cylindrical hub with a threaded bore therethrough for receiving said spindle member therethrough, and an annular shoulder extending from said hub and having an outer diameter somewhat larger than said hub, said shoulder having a leading abutment surface projecting beyond the end of said hub for contact with the surround structure.

6. The shaft puller according to the claim 5 further comprising:

a ring insert receivable within said annular shoulder, said insert having an abutment surface for contact with the surround structure.

7. The shaft puller according to claim 6 wherein said ring insert abutment surface is flush with the leading abutment surface of said annular shoulder.

8. The shaft puller according to claim 6 wherein said ring insert abutment surface extends beyond the abutment surface of said annular shoulder.

9. A shaft puller for extracting a shaft from a surround structure, said shaft having a threaded exposed end normally receiving a nut having cooperating threads for being threaded onto said shaft and opposing flats to facilitate the turning of the nut on the shaft, said puller comprising:

a sleeve structure having an internally threaded bore therethrough, the threads of said sleeve structure being of an opposite hand from the threads of said shaft, and a spindle member having external threads thereon of the same hand as the threads of the sleeve structure such that the spindle member may be threadably received within the bore of said sleeve structure, said spindle member having a bore therethrough of sufficient size to permit free movement of said spindle member relative to said shaft, said spindle member having a head plate attached to the end of said spindle opposite the end engaged in said sleeve structure and engageable by the nut of said shaft, said head plate having flats corresponding to the flats of said nut whereby said nut and head plate may be simultaneously turned by a common tool to advance said nut on the shaft thereby withdrawing the spindle member from said sleeve structure to pull the shaft from the surround structure.

* * * * *